US010732378B2

(12) United States Patent
Cannon et al.

(10) Patent No.: US 10,732,378 B2
(45) Date of Patent: Aug. 4, 2020

(54) MOUNTING OPTICAL ELEMENTS IN OPTICAL SYSTEMS

(71) Applicant: FLIR Systems, Inc., Wilsonville, OR (US)

(72) Inventors: Bruce Cannon, Portland, OR (US); Bruce A. Dickerson, Tigard, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 123 days.

(21) Appl. No.: 15/866,256

(22) Filed: Jan. 9, 2018

(65) Prior Publication Data

US 2018/0210166 A1   Jul. 26, 2018

Related U.S. Application Data

(60) Provisional application No. 62/450,440, filed on Jan. 25, 2017.

(51) Int. Cl.
| | |
|---|---|
| *G02B 7/182* | (2006.01) |
| *G02B 7/198* | (2006.01) |
| *G02B 23/16* | (2006.01) |
| *G02B 23/10* | (2006.01) |
| *G02B 23/04* | (2006.01) |
| *G02B 17/06* | (2006.01) |
| *G02B 30/25* | (2020.01) |

(52) U.S. Cl.
CPC .......... *G02B 7/1822* (2013.01); *G02B 7/198* (2013.01); *G02B 17/0626* (2013.01); *G02B 23/04* (2013.01); *G02B 23/10* (2013.01); *G02B 23/16* (2013.01); *G02B 30/25* (2020.01)

(58) Field of Classification Search
CPC ...... G02B 7/182; G02B 7/198; G02B 7/1822; G02B 7/26; G02B 26/0841; G02B 26/0816; G02B 17/0626; G02B 23/10; G02B 23/16; B60R 1/04; B60R 1/072; B60R 1/12; B60R 1/06; B60R 1/1207; B60R 1/062
USPC ....................................................... 359/872
See application file for complete search history.

(56) References Cited

U.S. PATENT DOCUMENTS

| | | | |
|---|---|---|---|
| 4,723,075 A | 2/1988 | German | |
| 5,138,484 A * | 8/1992 | Schubert | ............ G02B 17/0808 250/330 |
| 5,400,133 A | 3/1995 | Hinton et al. | |
| 6,587,167 B1 | 7/2003 | Fujimori et al. | |
| 7,009,752 B1 * | 3/2006 | Lorell | .................. G02B 7/1821 359/198.1 |

(Continued)

*Primary Examiner* — William R Alexander
*Assistant Examiner* — Tamara Y. Washington
(74) *Attorney, Agent, or Firm* — Haynes and Boone, LLP

(57) ABSTRACT

Techniques are disclosed for mounting optical elements in optical systems. A system may include a mirror assembly. The mirror assembly may include a mounting stem and a mirror. The system may further include a mounting ring. The system may further include a metering structure. The metering structure may include a receiving interface having an inner surface defining an aperture. The metering structure may be configured to receive the mounting stem within the aperture and receive the mounting ring within a gap between the mounting stem and the inner surface. The system may further include a bonding layer disposed between the mounting stem and the mounting ring. Additional apparatus and related methods are provided.

20 Claims, 10 Drawing Sheets

(56) References Cited

U.S. PATENT DOCUMENTS

| | | | | |
|---|---|---|---|---|
| 7,843,632 | B2* | 11/2010 | Bowering | G02B 5/0891 |
| | | | | 250/504 R |
| 10,234,265 | B2* | 3/2019 | Schonleber | G01B 9/02063 |
| 10,642,014 | B2* | 5/2020 | Nolte | G02B 6/0008 |
| 2003/0117728 | A1* | 6/2003 | Hutzel | B60R 1/008 |
| | | | | 359/838 |
| 2005/0270620 | A1* | 12/2005 | Bauer | B60R 1/088 |
| | | | | 359/265 |
| 2013/0033736 | A1* | 2/2013 | McCabe | B60R 1/088 |
| | | | | 359/267 |
| 2017/0090178 | A1* | 3/2017 | Bullard | G02B 23/06 |
| 2019/0265456 | A1* | 8/2019 | Fox | G02B 21/26 |
| 2019/0310441 | A1* | 10/2019 | Suchowski | G01M 11/04 |
| 2020/0002828 | A1* | 1/2020 | Mills | C25B 1/04 |
| 2020/0049486 | A1* | 2/2020 | Christine | G01C 15/002 |
| 2020/0134773 | A1* | 4/2020 | Pinter | G06T 7/0006 |

* cited by examiner

MOUNTING OPTICAL ELEMENTS IN OPTICAL SYSTEMS

CROSS-REFERENCE TO RELATED APPLICATIONS

This application claims the benefit of and priority to U.S. Provisional Patent Application No. 62/450,440 filed Jan. 25, 2017 and entitled "MOUNTING OPTICAL ELEMENTS IN OPTICAL SYSTEMS," which is incorporated herein by reference in its entirety.

TECHNICAL FIELD

One or more embodiments relate generally to optical systems and more particularly, for example, to mounting optical elements in optical systems.

BACKGROUND

Reflective telescopes (also referred to as reflecting telescopes) are one type of precision optical assembly that involves careful alignment, positioning, and/or attachment of various elements to create a quality image. Elements may include optical elements such as mirrors, lenses, beamsplitters, and beam couplers, and elements for supporting and/or mounting the optical elements.

Conventional assembly techniques typically assume that the elements are formed using high-precision manufacturing processes to allow the elements to be disposed at their desired positions and with desired orientations/alignments. In such techniques, as an example, one element may directly mount into (e.g., snap together with) another element without additional optical reference positioning. However, such approaches allow very little room for tolerance and are demanding on fabrication vendors (e.g., mirror fabrication vendors). For instance, the reference/attachment points generally require high accuracy. In addition, the individual elements (or parts thereof) may be fabricated using different machining stations and have their own associated tolerances, which may impede high accuracy.

The tight tolerances of elements manufactured using such approaches generally limit the ability to mass produce optical systems formed using these elements. As an example, in some cases, each element and associated attachment features may need to be accurate to within single digit microns. In this regard, the tight tolerances are generally associated with higher costs and/or longer manufacturing time, including, for example, more time spent iteratively estimating or measuring errors associated with various elements of the optical systems, redesigning the elements, and/or manufacturing the redesigned elements.

SUMMARY

In accordance with various embodiments of the present disclosure, an improved approach to mounting optical elements in optical systems is provided. An optical system may include one or more optical elements, such as mirrors, and one or more connecting structures, such as mounting stems of the mirrors and a metering structure for receiving the mounting stems. In one or more embodiments, mounting rings and/or bonding layers are provided to fixedly join/couple the mirrors to the metering structure and keep the mirrors aligned with optical paths of the optical system, while also loosening tolerances associated with the manufacture of the connecting structures. In some cases, the bonding layers may fill gaps between the mounting rings and connecting structures (e.g., mounting stems, metering structures or components thereof) surrounding the mounting rings. The loosened tolerances may allow for a more streamlined, higher quantity and lower cost manufacturing of optical systems and/or components thereof.

In one or more embodiments, a system includes a mirror assembly. The mirror assembly includes a mounting stem and a mirror. The system further includes a mounting ring. The system further includes a metering structure. The metering structure includes a receiving interface having an inner surface defining an aperture. The metering structure is configured to receive the mounting stem within the aperture. The metering structure is further configured to receive the mounting ring within a gap between the mounting stem and the inner surface. The system further includes a bonding layer disposed between the mounting stem and the mounting ring.

In one or more embodiments, a method includes disposing a mounting stem of a mirror assembly within an aperture of a metering structure. The metering structure includes a receiving interface having an inner surface defining the aperture. The method further includes determining a gap between the mounting stem and the inner surface. The method further includes providing a mounting ring based on the gap. The method further includes disposing the mounting ring between the mounting stem and the inner surface. The method further includes applying a bonding layer between the mounting stem and the mounting ring.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
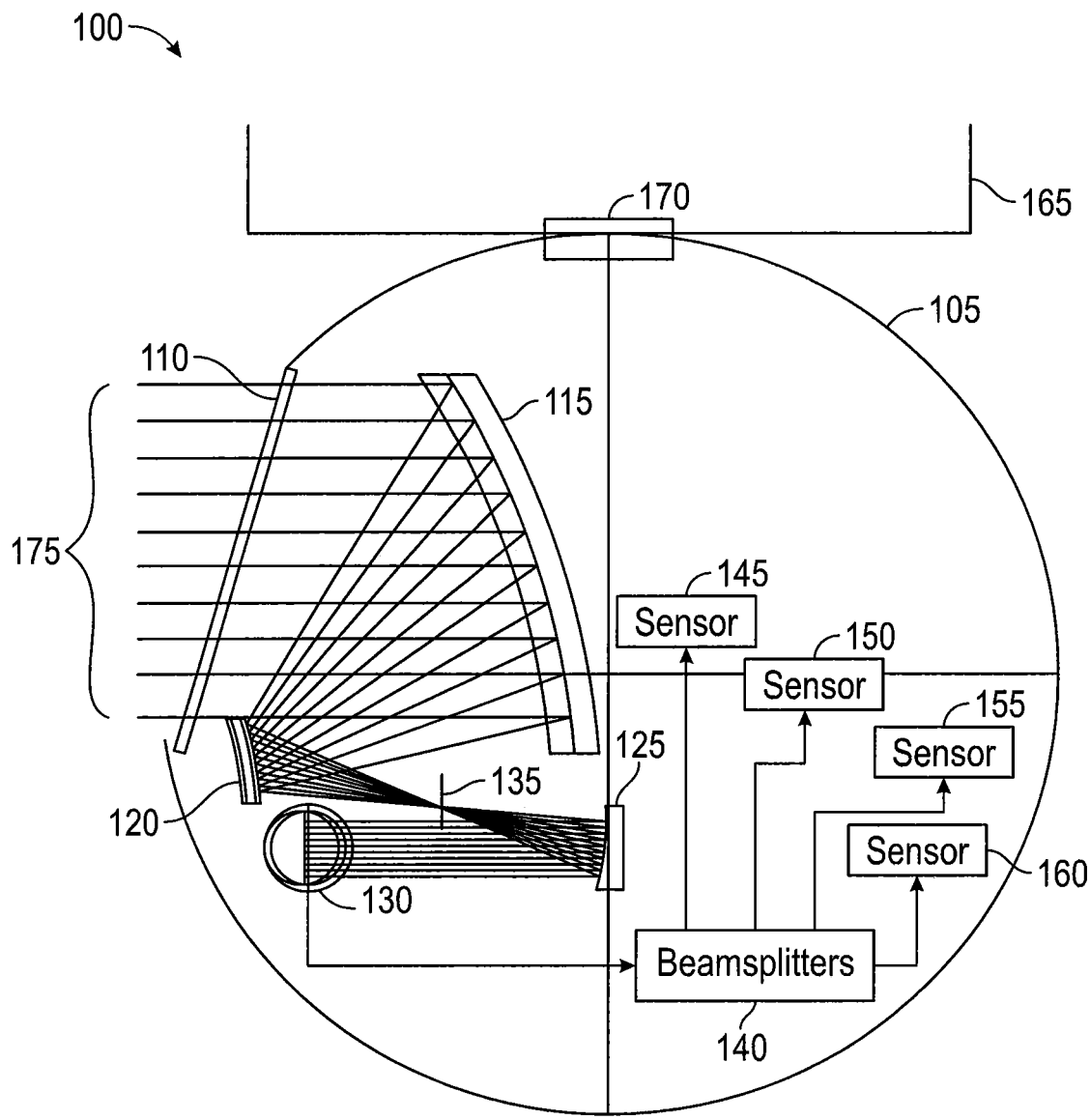
FIG. 1 illustrates an example of an optical system in accordance with an embodiment of the present disclosure.

Various techniques are provided to facilitate the assembly of optical systems. In some embodiments, an optical system may include one or more optical elements (e.g., mirrors) and one or more connecting structures (e.g., mounting stems, metering structures) to which the optical elements may be mounted. Through the use of mounting elements (e.g., mounting stems, mounting rings) and/or bonding layers (e.g., adhesive layers), the subject technology facilitates mounting the optical elements to the connecting structures and holding the optical elements in place to keep the mirrors aligned with optical paths of the optical system. In this regard, the mounting elements may be utilized to hold mirrors of an optical system in place, e.g. at a desired position and with a desired orientation/alignment, and maintain alignment of the mirrors with the optical paths during operation of the optical system. For example, the position may be represented as a coordinate in space (e.g., in three-dimensional space) relative to a predetermined frame of reference and the orientation/alignment may be represented as an angle relative to a predetermined frame of reference. Although the description of the present disclosure is made with respect to mirrors, the techniques described herein may be applied to mounting any desired optical components such as, for example, lenses, prisms, and/or other optical components as appropriate.

The mounting elements and/or bonding layers may hold the mirrors in place by fixedly joining/coupling the mirrors to the connecting structure of the optical system such that the mirrors are, for example, fastened, attached, or placed as to be firm and not readily movable. A mounting ring may have inner and outer surfaces that define corresponding inner and outer circles. The inner and outer surfaces may be coaxial surfaces (e.g., surfaces that a same center axis) or non-coaxial surfaces, in which case a cross-section of the inner and outer surfaces are concentric circles or eccentric circles, respectively. In an aspect, the non-coaxial surfaces may be surfaces that have center axes that are parallel to each another, but do not share the same center axis. A mounting ring with coaxial surfaces may be referred to as a concentric mounting ring. A mounting ring with non-coaxial surfaces may be referred to as an eccentric mounting ring and as exhibiting eccentricity, with inner and outer circles being offset (e.g., having centers that are offset) from each other.

In one or more embodiments, to hold the mirror in place, the mounting ring may be provided with a shape (e.g., concentric, eccentric) to accommodate a gap between a mounting stem of the mirror and an inner surface of a receiving interface of a metering structure for receiving the mounting stem. For example, eccentricity in the mounting ring may be utilized to accommodate asymmetry (e.g., eccentricity) in the gap.

After disposing the mounting ring in the gap, a bonding layer may be applied to fill each resulting gap, such as a gap between the mounting ring and an inner surface of the receiving interface and/or a gap between the mounting stem and the mounting ring. Any bonding layers may be cured to toughen/harden the bonding layers and set the mirror, mounting stem, and mounting ring in place. The mounting ring may allow use of thinner and more uniform bonding layers relative to a case in which no mounting ring is disposed, since the mounting ring may exhibit eccentricity to better fill a shape of a gap between the mounting stem and the inner surface of the receiving interface. A uniform glue-line or substantially uniform glue-line may be applied to allow curing of the binding material (e.g., adhesive) and utilization of the optical system at environmental extremes of a temperature range of operation (e.g., between about −50° C. and about 90° C.) without mirrors being brought out of optical position and alignment/orientation due to adhesive-curing stress and/or thermal stress.

In contrast, in the case without a mounting ring, a bonding layer may be used to fill an entirety of a large and/or asymmetric gap between the mounting stem and the inner surface of the receiving interface. Thicker and/or asymmetric bonding layers may allow temperature fluctuations to pull mirrors out of place during operation of the optical system and/or during curing operations (e.g., ultraviolet curing operations). In this regard, for example, different portions of the bonding layers with different thicknesses may be unevenly affected by forces/stress due to changes in temperature. Thus, for instance, a mirror that utilizes a bonding layer with a non-uniform cross-sectional size may be pulled out of position and/or orientation/alignment when the bonding layer shrinks (e.g., shrinks non-uniformly across its cross-section) due to temperature fluctuations during operation of the optical system and/or during curing operations.

In one or more embodiments, mirrors of the optical system may be formed of the same material. The mirror material may have a high specific strength (e.g., modulus/density) and also may take a smooth final polish. By way of non-limiting example, the material may include aluminum, beryllium, silicon, silicon-carbide, glass (e.g., borosilicate glass), plastic, ceramic alloys, or combination thereof. In some cases, the material may include various ceramic alloys that combine aluminum with any of these other materials listed. The material of the connecting structures, including mounting stems, metering structure, and/or mounting ring, may be the same as (e.g., selected to be the same) or similar to the mirror material. In an aspect, materials may be considered similar to each other when material properties, such as mechanical properties and thermal properties, of the materials are similar to each other.

In one or more embodiments, the bonding layers may be selected to have the same or similar properties (e.g., mechanical properties, thermal properties) as the materials to be bonded using the bonding layer (e.g., mounting stem, mounting ring, annular portion of metering structure). A smaller cross-section of the bonding layer (e.g., a thinner bonding layer) is generally utilized to reduce effects that result from the bonding layer having different properties from the materials bonded by the bonding layer. In some cases, the materials of the mirrors, mounting stem, mounting ring, metering structure, and bonding layer may be amenable to an ultraviolet (UV) curing operation, which is associated with lower curing times (e.g., relative to a room temperature curing operation).

The use of the same material for the mirrors and the mounting/supporting components (e.g., mounting stems, mounting ring, metering structure or components thereof) may allow athermalization of the optical system, in which the optical system behaves uniformly over a temperature range of interest (e.g., a temperature range of operation of the optical system). In this case, since the athermalization may be achieved through the use of the same material for the mirrors and the mounting/supporting components, such athermalization may be referred to as athermalization by common material or mono-material athermalization.

Utilization of the mounting ring (e.g., and eccentricity thereof, if needed) and/or bonding layers may facilitate loosening of tolerances (e.g., mechanical tolerances) in the manufacture of the various components, including mirrors and associated mounting/support components for disposing the mirrors in the optical system and holding the mirrors in place. The mounting/support components may include mirror stems and a metering structure and components thereof (e.g., arms and annular portions of the metering structure). In some cases, the tolerances may be loosened through the use of the mounting rings (e.g., and eccentricity thereof) and/or thin, uniform bonding layers. The tolerances may account for manufacturing errors, which may include, by way of non-limiting example, an error in a size of a mounting stem, an error in a position at which the mounting stem is connected to (e.g., attached to, integral with) a mirror, a form error in the mirror (e.g., error in size and/or shape of mirror), a size of a receiving interface of a metering structure, among others.

The loosened tolerances may facilitate mass production of optical systems and components thereof by allowing for a more streamlined, higher quantity and lower cost manufacturing of the optical systems and components thereof. In contrast, tighter tolerances are generally associated with higher costs and longer manufacturing time, including, for example, more time spent iteratively estimating or measuring errors associated with the components used to form the optical systems, redesigning the components, and/or manufacture the redesigned components. In some cases, embodiments of the present disclosure may allow a relatively coarse positioning on a non-optical side of the mirrors to the mounting/support components (e.g., mirror stems, annular portions of metering structure), and accommodate for such coarse positioning through the use of the mounting rings and/or bonding layers.

In one or more embodiments, an optical system may be, may include, or may be a part of, a telescope, a fiber optic system, or generally any system in which optical elements are mounted to a connecting structure. The optical system may be packed into a gimbal. In an embodiment, the optical system may be operated in a temperature range between about −50° C. and about 90° C. In another embodiment, the optical system may be operated at temperatures below −50° C. and/or above 90° C.

For example, in an embodiment, the optical system may be, may include, or may be a part of, a reflective telescope (also referred to as a reflecting telescope). In some applications, reflective telescopes are precision optical assemblies that require careful alignment/positioning of each element to capture a quality image. The telescope may include mirrors, where at least some of these mirrors are mounted to a metering structure using a mounting ring and one or more bonding layers. The image captured by the telescope may be provided directly to a user of the telescope, such as via an eyepiece of the telescope, and/or to one or more processors and/or sensors to generate one or more images. In an aspect, the telescope may be packed into a gimbal.

In some cases, a telescope in accordance with an embodiment of the present disclosure may be an on-axis telescope or an off-axis telescope. The on-axis telescope and off-axis telescope may be referred to as a rotationally-symmetric telescope and a non-rotationally-symmetric telescope, respectively. In an on-axis telescope, an optical axis of a primary mirror may be obstructed by a secondary mirror, tertiary mirror, quaternary mirror, and/or other mirrors. In contrast, in an off-axis telescope, an optical axis of each mirror of the telescope is generally not obstructed by any other mirror.

By way of non-limiting example, on-axis telescopes may be based on a Cassegrain, Ritchey-Chretien, Gregorian, or Maksutov design, among others. On-axis telescopes may have a central obscuration. An off-axis telescope may be based on an off-axis three-mirror-anastigmat (TMA) design, among other possible off-axis designs. In some cases, the use of an off-axis telescope may allow central obscuration to be avoided. However, in some cases, off-axis telescopes may be more difficult to align and assemble than on-axis telescopes. In an embodiment, the subject technology facilitates aligning and positioning mirror assemblies to provide an optical system that is, includes, or is a part of, a telescope, and is applicable to on-axis and off-axis telescopes (e.g., on-axis and off-axis reflective telescopes).

Turning now to the drawings, FIG. 1 illustrates an example of an optical system 100 in accordance with an embodiment of the present disclosure. Not all of the depicted components may be required, however, and one or more embodiments may include additional components not shown in FIG. 1. Variations in the arrangement and type of the components may be made without departing from the spirit or scope of the claims as set forth herein. Additional, fewer, and/or different components may be provided.

The optical system 100 includes a housing 105, an input collecting aperture 110, a primary mirror 115, a secondary mirror 120, a tertiary mirror 125, and an output collecting aperture 130. The aperture 110 may be, or may include, a window recessed into the housing 105. Electromagnetic (EM) radiation may enter (e.g., couple into) the housing 105 via the aperture 110 and be relayed to the aperture 130 via the mirrors 115, 120, and 125. In this regard, the mirrors 115, 120, and 125 may include an optical surface for reflecting EM radiation incident on a surface of the mirrors 115, 120, and 125. EM radiation may generally refer to any radiation in the EM spectrum and may be referred to as an EM beam of radiation, EM beam, light, beam, or variant thereof (e.g., EM beam of light). The term light may include visible light, infrared light, ultraviolet light, or generally any portion of the EM spectrum.

In an embodiment, the mirrors 115, 120, and 125 may be formed of the same material. The mirror material may have a high specific strength (e.g., modulus/density) and also may take a smooth final polish. By way of non-limiting example, the mirror material may include aluminum, beryllium, silicon, silicon-carbide, glass (e.g., borosilicate glass), plastic, ceramic alloys, or combination thereof. In some cases, the mirror material may include various ceramic alloys that combine aluminum with any of these other materials listed.

The apertures 110 and 130 may be round, circular, substantially circular, oval, substantially oval, or another shape. In an embodiment, such as shown in FIG. 1, the aperture 110 may be larger than the aperture 130. For example, for circular (or substantially circular) collecting apertures, the aperture 110 may be about 6 inches to about 8 inches in diameter, and/or the aperture 130 may be about 0.5 inches to about 2 inches. In such a case, an image captured by the aperture 110 may be magnified based on a size difference (e.g., surface area difference of reflective mirror surface) between the apertures 110 and 130 (e.g., a larger size difference is associated with higher magnification), with the magnified image being output from the aperture 130.

Figure 2:
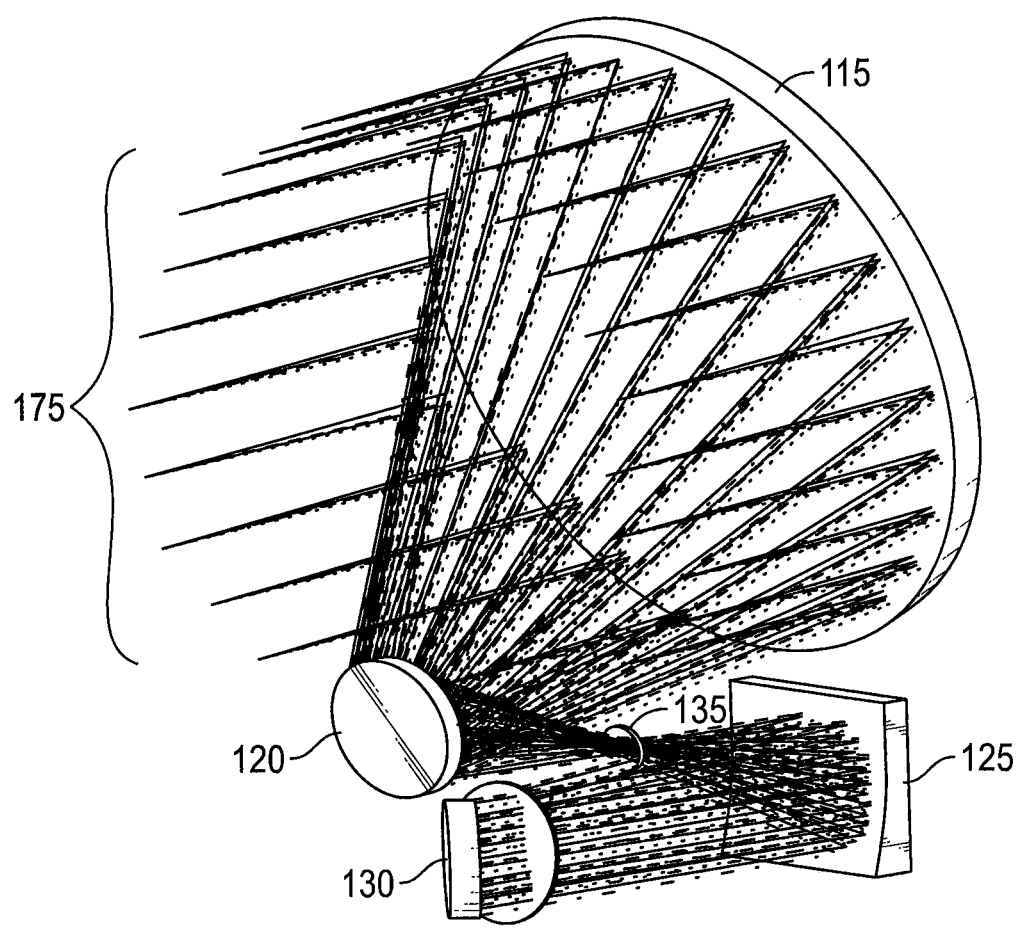
FIG. 2 illustrates a perspective view of an aperture and mirrors that form part of the optical system of FIG. 1 in accordance with an embodiment of the present disclosure.

As shown in FIG. 1, an input beam 175 enters the housing 105 via the aperture 110. The beam 175 may traverse from the aperture 110 to the mirror 115. The mirror 115 may reflect (e.g., pass, relay) the beam 175 to the mirror 120. The mirror 120 may reflect the beam 175 to the mirror 125. In some cases, the beam 175 reflected by the mirror 120 may pass through a focus 135 of the mirror 120, where the focus 135 is between the mirror 120 and the mirror 125. The mirror 125 may reflect the beam to the aperture 130. In this regard, in FIG. 1, an optical path of the optical system 100 is a path that the beam 175 takes in traversing through the optical system 100 and includes a path from the aperture 110 to the mirror 115, a path from the mirror 115 to the mirror 120, a path from the mirror 120 to the mirror 125, and a path from the mirror 125 to the aperture 130. FIG. 2 illustrates a perspective view of the mirrors 115, 120, and 125 and aperture 130 that form part of the optical system 100 in accordance with an embodiment of the present disclosure. It is noted that an intensity of the beam 175 may be attenuated, such as by absorption and/or scattering losses, as the beam 175 traverses through the optical path and/or impinges on mirror surfaces.

In an embodiment, optical paths of the optical system 100 may further include paths from the aperture 130 to one or more additional processors and/or sensors. As an example, in FIG. 1, the optical paths of the optical system 100 may include the paths from the aperture 130 to one or more beamsplitters 140 and sensors 145, 150, 155, and 160. The beamsplitters 140 may be, or may include, dichroic beamsplitters. The sensors 145, 150, 155, and 160 may be associated with different wavelength ranges. By way of non-limiting example, the sensors 145, 150, 155, and 160 may be, may include, one or more of a visible light sensor, a short-wave infrared (IR) sensor, a mid-wave IR sensor, a low-light sensor, and/or other sensors. In an embodiment, one or more of the sensors 145, 150, 155, and 160 may be part of a camera. It is noted that, although four sensors are shown in the optical system 100, fewer, more, and/or different sensors may be utilized. Alternatively or in addition, the aperture 130 may be coupled to an eyepiece (not shown) that allows a user to observe an image formed by a beam that enters the aperture 110 and is coupled to the aperture 130 via the mirrors 115, 120, and 125. Although in FIG. 1 the housing 105 of the optical system 100 includes (e.g., contains) the beamsplitters 140 and sensors 145, 150, 155, and 160, one or more of the beamsplitters 140 and/or the sensors 145, 150, 155, and 160 may be external to the housing 105 in other cases.

In an aspect, the beamsplitters 140 may include one or more beamsplitters for splitting incident beams and providing (e.g., directing) these split portions of the incident beams to one or more of the sensors 145, 150, 155, and 160. The beamsplitters 140 may split an incident beam into spectrally distinct beams (e.g., beams of different wavelength ranges). The beamsplitters 140 may include a beamsplitter that splits an incident beam into a first beam directed to one of the sensors 145, 150, 155, and 160 and a second beam directed to another one of the sensors 145, 150, 155, and 160. For example, the first beam may be directed to the sensor 145 (e.g., a visible light sensor) and the second beam may be directed to the sensor 150 (e.g., a short-wave IR sensor). In some cases, the beamsplitters 140 may include beamsplitters in series. For example, a first beamsplitter may split an incident beam into a first beam directed to the sensor 155 and a second beam. A second beamsplitter may direct a portion of the second beam to the sensor 145 and another portion of the second beam to the sensor 150.

In some cases, relay optics (not shown) may be utilized to direct (e.g., pass, relay) a beam from the aperture 130 to the beamsplitters 140 and/or direct a beam from the beamsplitters 140 to one or more of the sensors 145, 150, 155, and 160. Relay optics may include lenses, mirrors, beamsplitters, beam couplers, prisms, or generally any optical elements that may be utilized to help direct a beam along or toward a desired direction. For example, a first set of relay optics may direct a beam from the aperture 130 to the beamsplitters 140 and/or a second set of relay optics may direct a beam from the beamsplitters 140 to some (e.g., at least one) of the sensors 145, 150, 155, and 160. In some cases, the beamsplitters 140 may provide an output beam to some of the sensors 145, 150, 155, and 160 without any intervening relay optics.

In FIG. 1, the beams are depicted as rays of EM radiation. Other rays may enter the housing 105 (e.g., via the aperture 110) aside from those rays shown in FIG. 1. However, these rays may enter in a direction (e.g., from an angle) not amenable to being coupled from the aperture 110 to the aperture 130, and may be considered noise of the optical system 100. Such rays are not depicted in FIG. 1 in order to avoid obscuring components of FIG. 1.

In an embodiment, the optical system 100 may be engaged with, attached to, and/or mounted on a platform 165 (e.g., a mounting platform). In FIG. 1, an upper portion of the housing 105 is engaged to the platform 165 via an engagement 170. For example, the platform 165 may be a platform of a vehicle that facilitates transportation and/or rotation of the optical system 100. The vehicle may be a ground vehicle (e.g., automobile), maritime vehicle, or aerial vehicle (e.g., manned or unmanned aerial vehicle). As another example, the platform 165 may be a tripod, an optical system mount (e.g., a telescope mount), or generally any platform onto which the optical system 100 may be mounted. In some cases, the housing 105 may be rotatably engaged to the platform 165, such that the optical system 100 can be rotated about the platform 165, e.g. to allow adjustment of the field of view of the optical system 100. In an aspect, the engagement 170 may be mechanical, electrical, and/or magnetic in nature.

Although the optical system 100 in FIG. 1 includes three mirrors for directing (e.g., reflecting) EM waves (e.g., visible light, infrared radiation), the optical system 100 may include fewer or more than three mirrors, or a different arrangement of the three mirrors. Similarly, the optical system 100 may include additional components, such as optics (e.g., mirrors, lenses, beamsplitters), processors, and/or sensors, not shown in FIG. 1. For example, the optical system 100 may include one or more additional mirrors, input collecting apertures, and output collecting apertures (not shown in FIG. 1) that capture and relay EM radiation. Similar to the foregoing description of the optical system 100, the additional input collecting apertures may each have a respective field of view, capture EM radiation from its field of view, and couple the captured EM radiation or portion thereof to one or more sensors and/or an eyepiece via the output collecting apertures.

In addition, FIG. 1 illustrates an off-axis optical system assembly, in which the optical axis of any one of the mirrors 115, 120, and 125 is not obstructed by any other of the mirrors 115, 120, and 125, In this regard, an optical axis of the mirror 115 is not obstructed by the mirrors 120 and 125, an optical axis of the mirror 120 is not obstructed by the mirrors 115 and 125, and an optical axis of the mirror 125 is not obstructed by the mirrors 115 and 120. In other cases, an on-axis optical system may be provided rather than an off-axis optical system.

Figure 3:
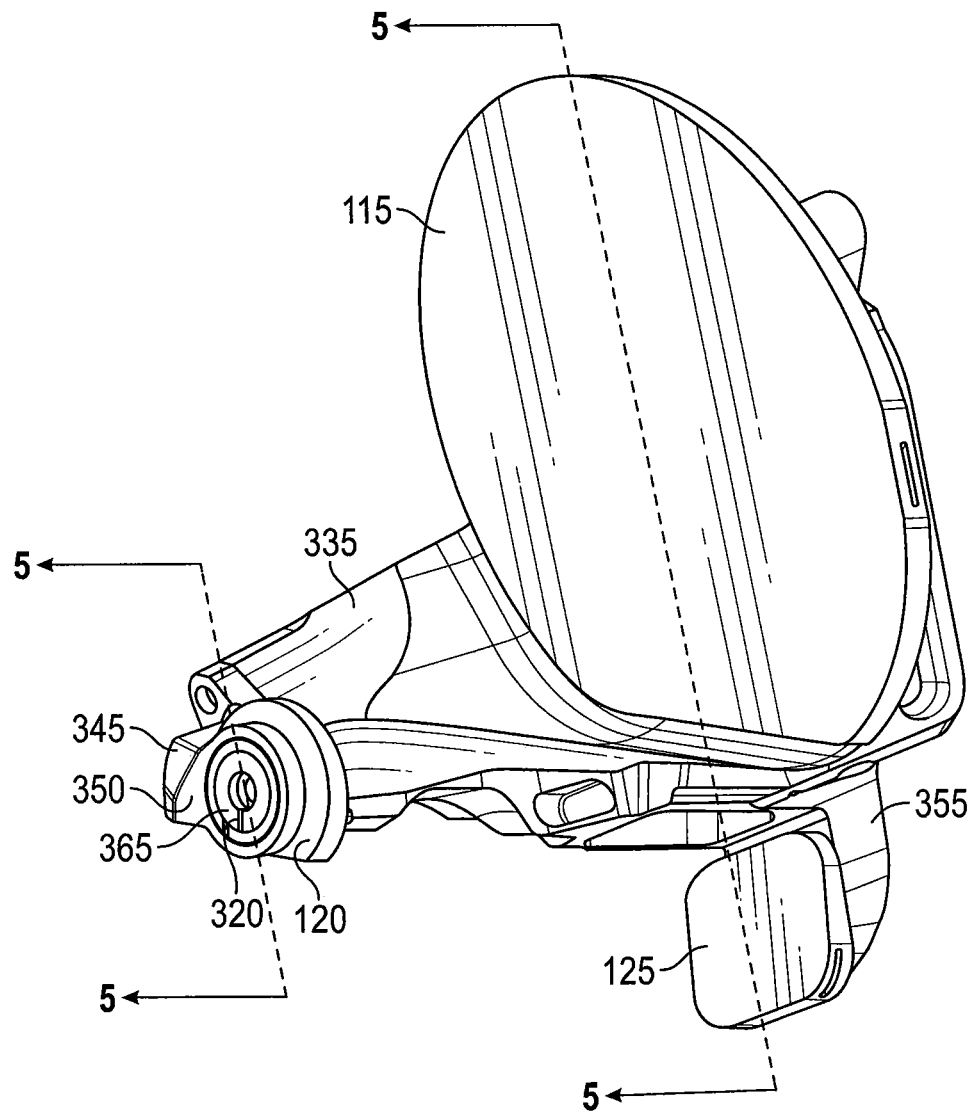
FIGS. 3 and 4 illustrate perspective views of mirrors of the optical system shown in FIG. 1, together with associated mounting/support components in accordance with embodiments of the present disclosure.
Figure 4:
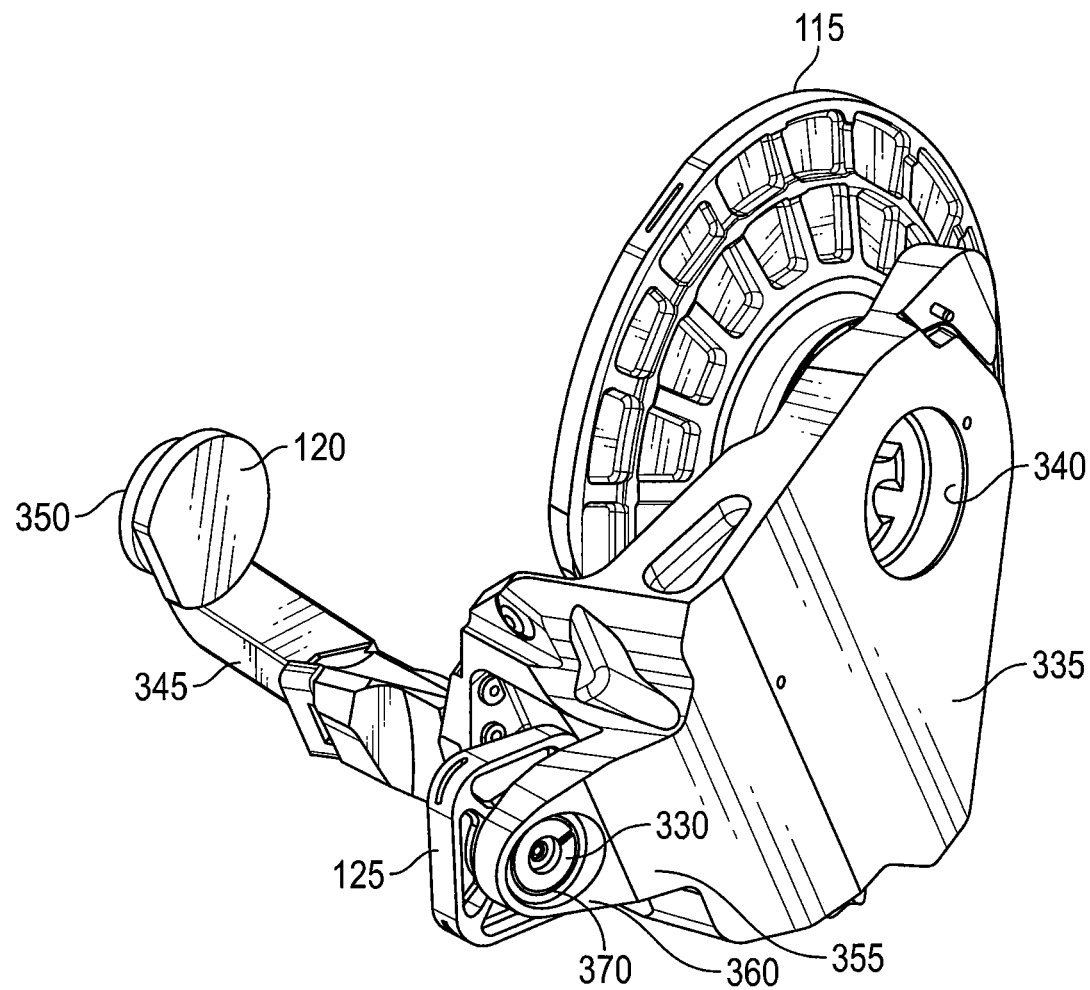
Figure 5:
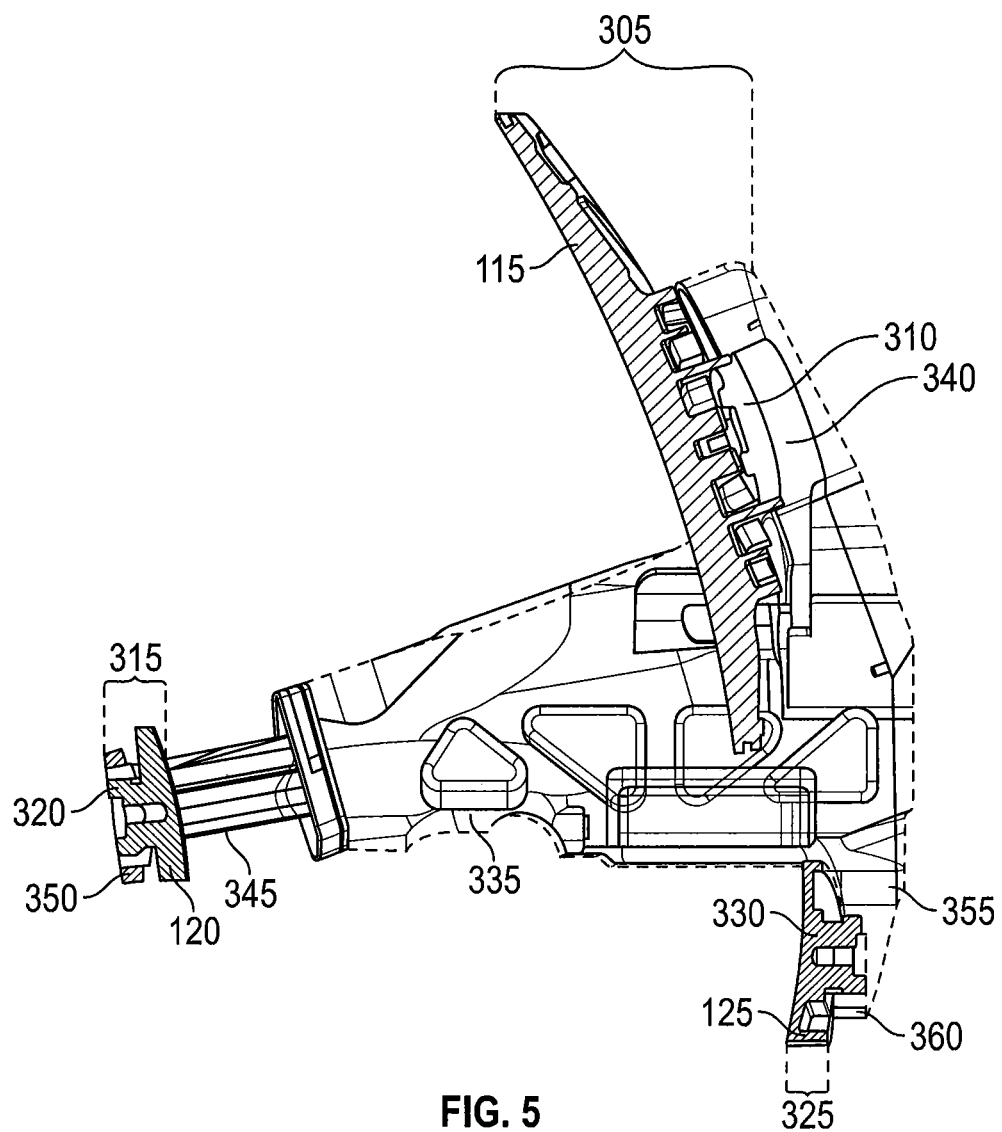
FIG. 5 illustrates a cross-sectional side view taken along a plane formed by lines 5-5 identified in FIG. 3 in accordance with an embodiment of the present disclosure.

FIGS. 3 and 4 illustrate perspective views of the mirrors 115, 120, and 125 of the optical system 100 shown in FIG. 1, together with associated mounting/support components in accordance with embodiments of the present disclosure. FIG. 5 illustrates a cross-sectional side view taken along a plane formed by lines 5-5 identified in FIG. 3 in accordance with an embodiment of the present disclosure. Not all of the depicted components may be required, however, and one or more embodiments may include additional components not shown in FIGS. 3 through 5. Variations in the arrangement and type of the components may be made without departing from the spirit or scope of the claims as set forth herein. Additional, fewer, and/or different components may be provided. Although FIGS. 3 through 5 are described with reference to the optical system 100, the arrangement of mirrors and associated mounting/support components may be utilized in other optical systems.

A primary mirror assembly 305 includes the primary mirror 115 and a mounting stem 310. A secondary mirror assembly 315 includes the secondary mirror 120 and a mounting stem 320. A tertiary mirror assembly 325 includes the tertiary mirror 125 and a mounting stem 330. The mounting stems 310, 320, and 330 may have a cylindrical or substantially cylindrical shape. The mounting stems 310, 320, and 330 may be referred to as a plug.

In an embodiment, the mirrors 115 and 125 may be parabolic mirrors, and the mirror 120 may be a different conic mirror, such as a hyperbolic mirror. In some cases, the mirrors 115, 120, and 125 may share a common axis of rotation. In other cases, the mirrors 115, 120, and 125 do not share a common axis of rotation. In an embodiment, the mirrors 115, 120, and 125 may be truncated mirrors.

The mounting stems 310, 320, and/or 330 may provide a surface to be utilized as an attachment point for the mirrors 115, 120, and/or 125, respectively. In some cases, the mirrors 115, 120, and 125 may be attached to the mounting stems 310, 320, and 330, respectively, e.g. via an adhesive and/or engagement feature disposed between the mirror (e.g., 115) and its mounting stem (e.g., 310). In other cases, the mirrors 115, 120, and/or 125 may be integral with the mounting stems 310, 320, and/or 330, respectively. In this regard, for example, the mirror 115 and the mounting stem 310 may be fabricated in one piece, the mirror 120 and the mounting stem 320 may be fabricated in one piece, and/or the mirror 125 and the mounting stem 330 may be fabricated in one piece.

The mounting stems 310, 320, and 330 facilitate mounting of the mirrors 115, 120, and 125, respectively, to a metering structure 335. The metering structure 335 may be referred to as a main connecting structure, connecting structure, mounting structure, mirror connecting structure, or variant thereof. The metering structure 335 includes an annular portion 340. The metering structure 335 includes an arm 345 that terminates in an annular portion 350. Similarly, the metering structure 335 includes an arm 355 that terminates in an annular portion 360. The annular portions 340, 350, and 360 define a receiving interface for receiving the mirror assemblies 305, 315, and 325, respectively. The receiving interfaces defined by the annular portions 340, 350, and 360 may be round, circular, substantially circular, oval, substantially oval, or another shape. In this regard, the receiving interfaces defined by the annular portions 340, 350, and 360 may have a shape for facilitating receipt of the mounting stems 310, 320, and 330, respectively. The annular portions 340, 350, and 360 may be fabricated with a size larger than the mounting stems 310, 320, and 330, respectively, to facilitate disposing of the mounting stems 310, 320, and 330 into the receiving interface of the annular portions 340, 350, and 360.

In some cases, the arms 345 and/or 355 may constitute rotatable and/or movable appendages of the metering structure 335, such that the arms 345 and/or 355 may be repositioned to accommodate a desired position and/or orientation/alignment of the mirror assemblies 315 and/or 325, respectively. In other cases, the arms 345 and/or 355 is not rotatable and/or not movable.

In an embodiment, a mounting ring may be disposed in a gap between a mounting stem and an inner surface of a receiving interface defined by an annular portion. The inner surface of the receiving surface may be an inner surface of the annular portion. The mounting ring may be utilized to facilitate mounting of mirrors to a metering structure. As shown in FIG. 3, a mounting ring 365 is disposed between the mounting stem 320 and the inner surface of the receiving interface defined by the annular portion 350. As shown in FIG. 4, a mounting ring 370 is disposed between the mounting stem 330 and the inner surface of the receiving interface defined by the annular portion 360. In some cases, a mounting ring is not utilized for the annular portion 340. After disposing a mounting ring (e.g., 370), any remaining gaps, such as a gap between a mounting stem (e.g., 330) and the mounting ring and/or a gap between the mounting ring and the inner surface of the receiving interface defined by an annular portion (e.g., 360), may be filled with adhesive.

Although the foregoing description is with reference to an off-axis optical system, the foregoing description also applies to on-axis optical system. For example, in an on-axis optical system, mounting stems, mounting rings, and/or bonding layers may be utilized to facilitate mounting of mirrors into receiving interfaces of a metering structure.

Figure 6:
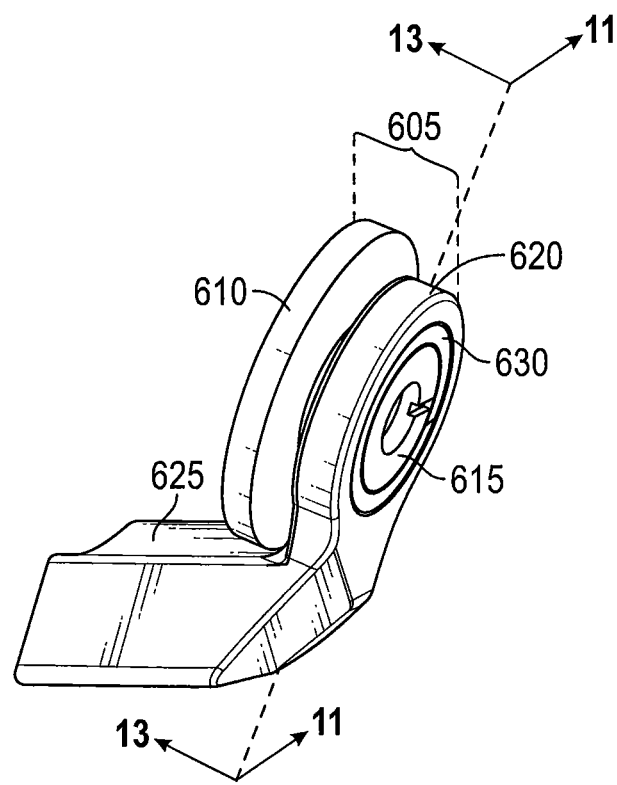
FIG. 6 illustrates a mirror assembly and its associated mounting/support components in accordance with an embodiment of the present disclosure.

FIG. 6 illustrates a mirror assembly 605 and its associated mounting and support components in accordance with an embodiment of the present disclosure. Not all of the depicted components may be required, however, and one or more embodiments may include additional components not shown in FIG. 6. Variations in the arrangement and type of the components may be made without departing from the spirit or scope of the claims as set forth herein. Additional, fewer, and/or different components may be provided.

The mirror assembly 605 includes a mirror 610 and a mounting stem 615. The mounting stem 615 of the mirror assembly 605 may be received by a receiving interface defined by an annular portion 620 of an arm 625 of a metering structure. In this regard, the receiving interface has an inner surface that defines an aperture (e.g., circular aperture), and the mounting stem 615 is received within the aperture. The inner surface of the receiving interface may be an inner surface of the annular portion 620. In some cases, the metering structure may include additional arms and/or additional annular portions for facilitating mounting of additional mirror assemblies. The receiving interface defined by the annular portion 620 may be round, circular, substantially circular, oval, substantially oval, or another shape. A mounting ring 630 may be disposed within a gap between the mounting stem 615 and the inner surface of the receiving interface to fill the gap. In some cases, after disposing the mounting ring 630, any remaining gaps, such as a gap between the mounting stem 615 and the mounting ring and/or a gap between the mounting ring and the inner surface of the receiving interface, may be filled with adhesive. In this regard, the mounting ring 630 allows the mirror assembly 605 to better fit into the metering structure.

In an embodiment, the mirror assembly 605 may be (but need not be) any one of the secondary mirror assembly 315 or the tertiary mirror assembly 325. In this regard, the arm 625 may be the arm 345 or 355, the annular portion 620 may be the annular portion 350 or 360, the mounting ring 630 may be the mounting ring 365 or 370, and so forth. The arm 625 may be an arm of the metering structure 335 shown, for example, in FIG. 3. Accordingly, the description from FIGS. 1-5 generally applies to FIG. 6, and vice versa, at least with respect to these components.

By way of non-limiting example, the material of the mirror 610 may include aluminum, beryllium, silicon, silicon-carbide, glass (e.g., borosilicate glass), plastic, ceramic alloys, or combination thereof. In some cases, the material may include various ceramic alloys that combine aluminum with any of these other materials listed. In an embodiment, the material of the mounting/support structures, including the mounting stem 615, mounting ring 630, and metering structure and components thereof (e.g., annular portion 620, arm 625), may be the same (e.g., selected to be the same) as or similar to the material of the mirror 610. In an aspect, materials may be considered similar to each other when material properties, such as mechanical properties and thermal properties, of the materials are similar to each other.

Figure 7:
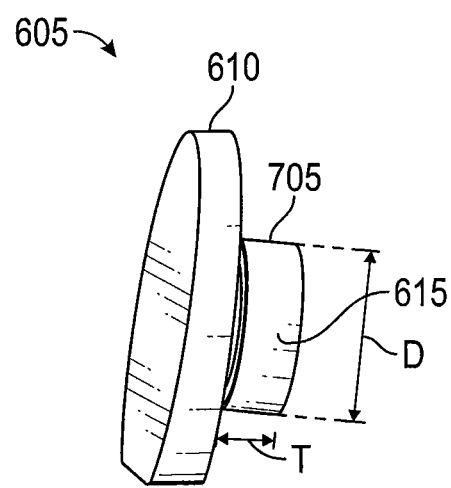
FIG. 7 illustrates a close-up view of the mirror assembly shown in FIG. 6 in accordance with an embodiment of the present disclosure.

FIG. 7 illustrates a close-up view of the mirror assembly 605 in accordance with an embodiment of the present disclosure. The mirror assembly 605 includes the mirror 610 and the mounting stem 615. The mounting stem 615 has a surface 705 (e.g., an outer surface or outer periphery of the mounting stem 615). In an embodiment, the mirror 610 may be attached to the mounting stem 615, e.g. on a back side (e.g., non-optical side) of the mirror 610. A non-optical side of the mirror 610 may refer to a side of the mirror 610 that is not used (e.g., not aligned/oriented) to reflect light. The mirror 610 and the mounting stem 615 may be made of the same material. In an aspect, the mirror 610 and the mounting stem 615 may be fabricated in two pieces and attached together, e.g. via an adhesive layer and/or engagement feature disposed between the mirror 610 and the mounting stem 615. In another aspect, the mirror 610 may be integral with the mounting stem 615. For example, the mirror 610 and the mounting stem 615 may be fabricated in one piece.

Figure 8A:
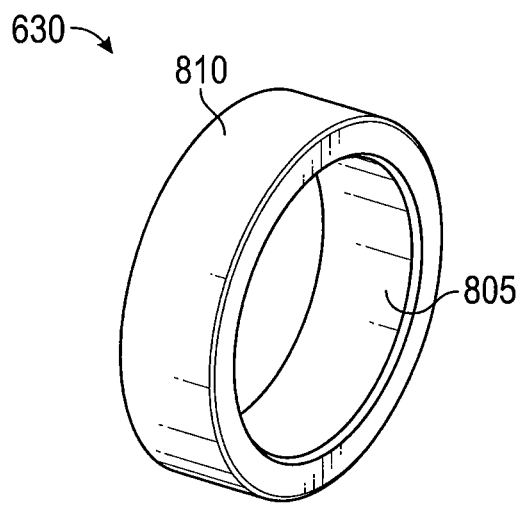
FIG. 8A illustrates a perspective view of a mounting ring shown in FIG. 6 in accordance with an embodiment of the present disclosure.
Figure 8B:
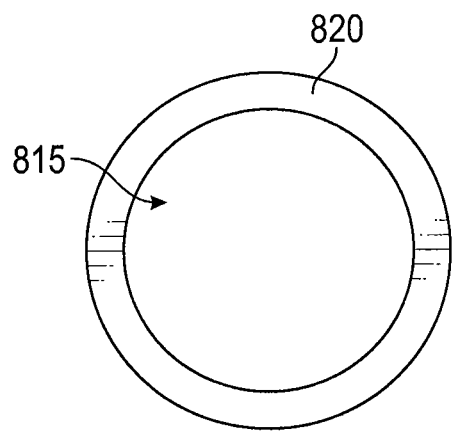
FIG. 8B illustrates a front view of the mounting ring of FIG. 8A in accordance with an embodiment of the present disclosure.

FIG. 8A illustrates a perspective view of the mounting ring 630. FIG. 8B illustrates a front view of the mounting ring 630 in accordance with an embodiment of the present disclosure. For explanatory purposes, the mounting ring 630 has a circular cross-section; however, the mounting ring 630 may have cross-sectional shapes that are round, substantially circular, oval, substantially oval, or another shape. The mounting ring 630 has an inner surface 805 and an outer surface 810, which define an inner circle 815 and an outer circle 820 shown in the front view. The circles 815 and 820 may be concentric (e.g., share the same center) or eccentric (e.g., not share the same center). When the circles 815 and 820 are concentric, the mounting ring 630 may be referred to as a concentric mounting ring. When the circles 815 and 820 are eccentric, the mounting ring 630 may be referred to as an eccentric mounting ring. In this case, the circles 815 and 820 have centers that are offset from each other. In an embodiment, the distance between the centers of an eccentric mounting ring may be thousandths of an inch.

Figure 9:
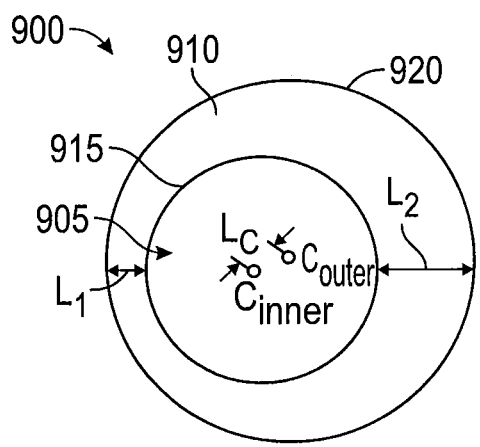
FIG. 9 illustrates an eccentric mounting ring in accordance with an embodiment of the present disclosure.

FIG. 9 illustrates an eccentric mounting ring 900 in accordance with an embodiment of the present disclosure. The mounting ring 900 is illustrated with a more pronounced eccentricity than that shown by the mounting ring 630 in FIGS. 8A and 8B and may be used in place of mounting ring 630 where appropriate. For explanatory purposes, the mounting ring 900 has a circular vertical cross-section; however, the mounting ring 630 may have vertical cross-sectional shapes that are round, substantially circular, oval, substantially oval, or another shape. It is noted that FIG. 9 is not necessarily to scale and may depict an exaggerated eccentricity. The eccentric mounting ring 900 may be implemented with any of the various materials described with respect to the mounting ring 630.

The mounting ring 900 has an inner circle 905 and an outer circle 910 that are eccentric. As shown clearly in FIG. 9, eccentric circles are circles that do not share the same center, although the center (e.g., $C_{inner}$, $C_{outer}$) of each circle (e.g., 905, 910) is contained in one at least one of the circles. A mounting ring that has a cross-section with eccentric circles may be referred to as exhibiting eccentricity. The mounting ring 900 may be characterized by a distance (denoted as $L_c$) between the center $C_{inner}$ of the inner circle 905 and the center $C_{outer}$ of the outer circle 910, a smallest distance along a radial direction (denoted as $L_1$) between a periphery 915 of the inner circle 905 and a periphery 920 of the outer circle 910, and a largest distance along the radial direction (denoted as $L_2$) between the periphery 915 of the inner circle 905 and the periphery 920 of the outer circle 910.

Figure 10:
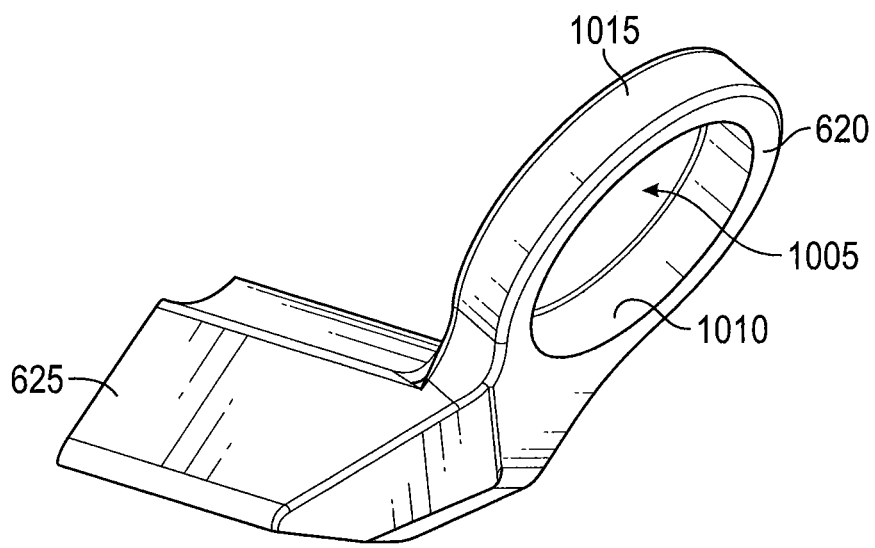
FIG. 10 illustrates mounting/structural components for facilitating mounting of a mirror assembly and a mounting ring to a metering structure in accordance with an embodiment of the present disclosure.

FIG. 10 illustrates mounting/structural components for facilitating mounting of the mirror assembly 605 and mounting ring 630 to a metering structure in accordance with an embodiment of the present disclosure. The arm 625 terminates in the annular portion 620. The annular portion 620 defines a receive interface 1005 configured to receive the mirror assembly 605 and mounting ring 630. The receiving interface 1005 defined by the annular portion 620 may be round, circular, substantially circular, oval, substantially oval, or another shape. The annular portion 620 has an inner surface 1010 and an outer surface 1015. In an aspect, the inner surface 1010 of the annular portion 620 is the same as the inner surface of the receiving interface 1005.

In an embodiment, when the mounting ring 630 is disposed in the receiving interface 1005, the outer surface 810 of the mounting ring 630 faces the inner surface 1010 of the annular portion 620. In some cases, the receiving interface 1005 may receive the mounting ring 630 such that the inner surface 1010 of the annular portion 620 is in physical contact with the outer surface 810 of the mounting ring 630. In other cases, a gap may be present between the inner surface 1010 of the annular portion 620 and the outer surface 810 of the mounting ring 630. A bonding layer may be applied to fill the gap. In this regard, the inner surface 1010 may be utilized as a glue interface onto which a bonding layer may be applied.

Although FIG. 10 is described with reference to FIG. 6, the mounting/structural components may be utilized to receive additional or different mirror assemblies, mounting rings, and/or other mounting/support components than those shown in FIG. 6. In addition, the metering structure may include additional arms and/or annular portions for receiving additional mirror assemblies, mounting rings, and/or other mounting/support components.

Figure 11:
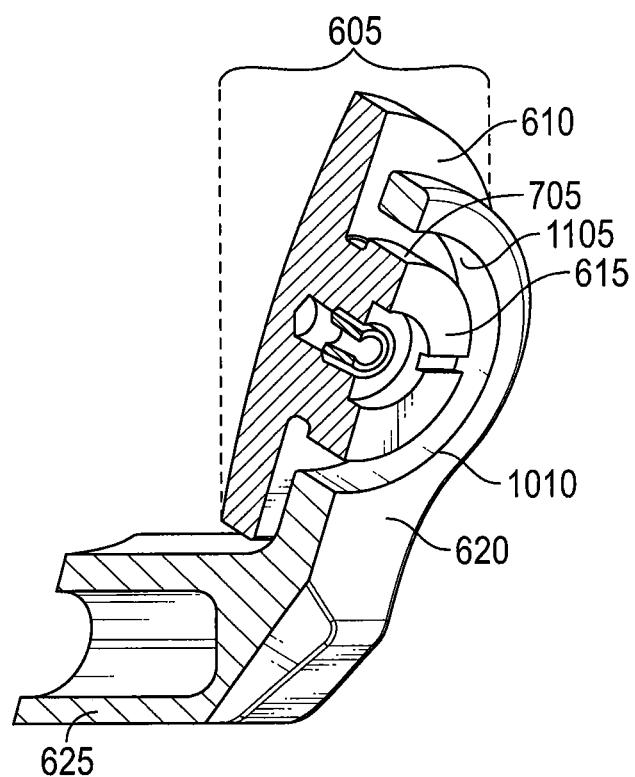
FIG. 11 illustrates a cross-sectional view taken along a line 11-11 identified in FIG. 6 and with a mounting ring removed in accordance with an embodiment of the present disclosure.

FIG. 11 illustrates a cross-sectional view taken along a line 11-11 identified in FIG. 6 and with mounting ring 630 removed in accordance with an embodiment of the present disclosure. The mirror assembly 605 is disposed in the receiving interface 1005 defined by the annular portion 620 of the arm 625. The surface 705 of the mounting stem 615 faces the inner surface 1010 of the annular portion 620, with a gap 1105 between the surface 705 and the inner surface 1010. As shown in FIG. 11, the gap 1105 may be ring-shaped. The gap 1105 may be characterized by a gap size and a gap shape (e.g., eccentricity exhibited by the gap) of the gap 1105.

Figure 12:
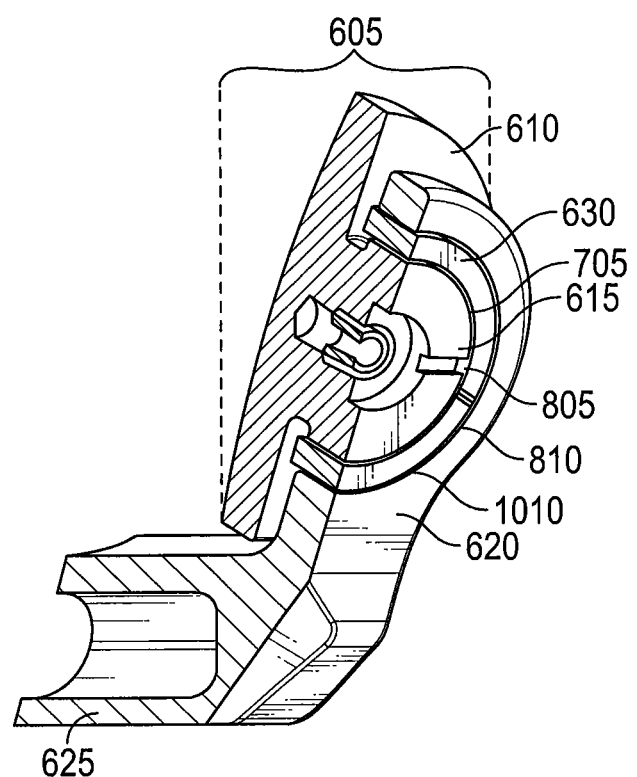
FIG. 12 illustrates a cross-sectional view taken along a line 11-11 identified in FIG. 6 with a mounting ring in place in accordance with an embodiment of the present disclosure.

FIG. 12 illustrates a cross-sectional view taken along a line 11-11 identified in FIG. 6 with mounting ring 630 in place in accordance with an embodiment of the present disclosure. The mounting ring 630 is disposed in the gap 1105 between the surface 705 of the mounting stem 615 and the inner surface 1010 of the annular portion 620, such that the mounting ring 630 fills at least a portion of the gap 1105. In an embodiment, bonding layer may be disposed in a gap between the inner surface 805 of the mounting ring 630 and the surface 705 of the mounting stem 615 and/or a gap between the outer surface 810 of the mounting ring 630 and the inner surface 1010 of the annular portion 620. In an embodiment, a bonding layer is disposed in the gap between the inner surface 805 of the mounting ring 630 and the surface 705 of the mounting stem 615, whereas no gap is present between the outer surface 810 of the mounting ring 630 and the inner surface 1010 of the annular portion 620 (e.g., the outer surface 810 and the inner surface 1010 are in physical contact).

Although FIG. 12 is described with reference to disposing the mounting ring 630 of FIG. 8A in the gap 1105, in other cases, the mounting ring 900 of FIG. 9 may be selected instead to fill the gap 1105. The mounting ring may be selected based on a gap (e.g., gap size, eccentricity of gap) between the inner surface (e.g., 805) of the mounting ring (e.g., 630) and a surface (e.g., 705) of the mounting stem and/or a gap between the outer surface (e.g., 810) of the mounting ring and the inner surface (e.g., 1010) of the annular portion (e.g., 620). The bonding layer may include an adhesive, solder, or generally any bonding material that may be applied to fill gaps and aid in holding mirrors in place.

Figure 13A:
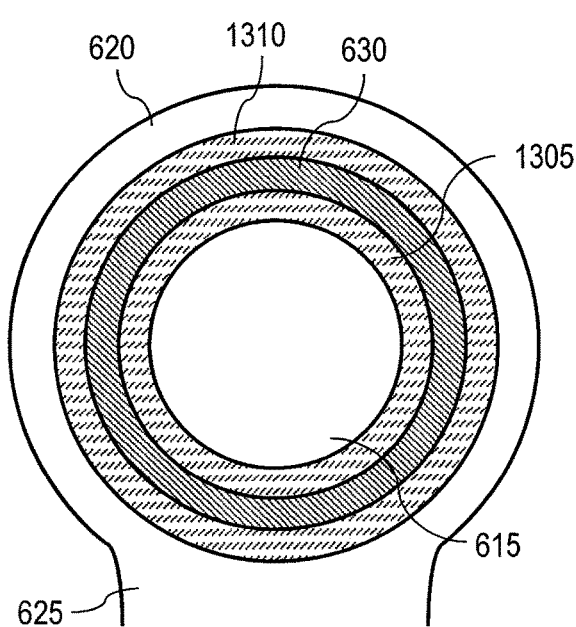
FIGS. 13A through 13C illustrate cross-sectional views of mounting/support components taken along a line 13-13 identified in FIG. 6 in accordance with embodiments of the present disclosure.
Figure 13B:
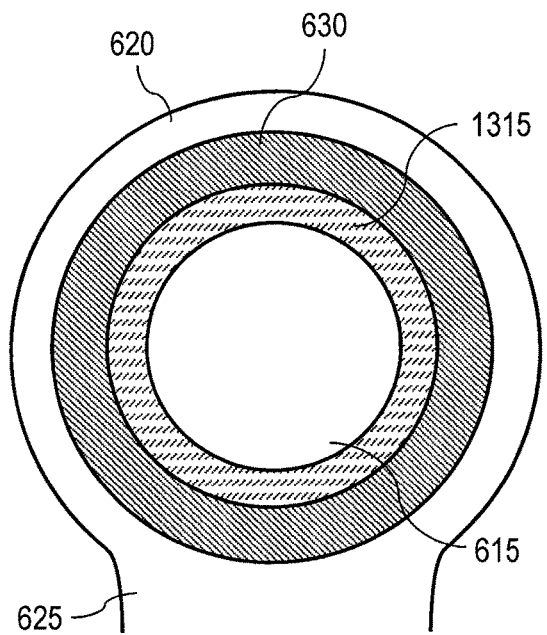
Figure 13C:
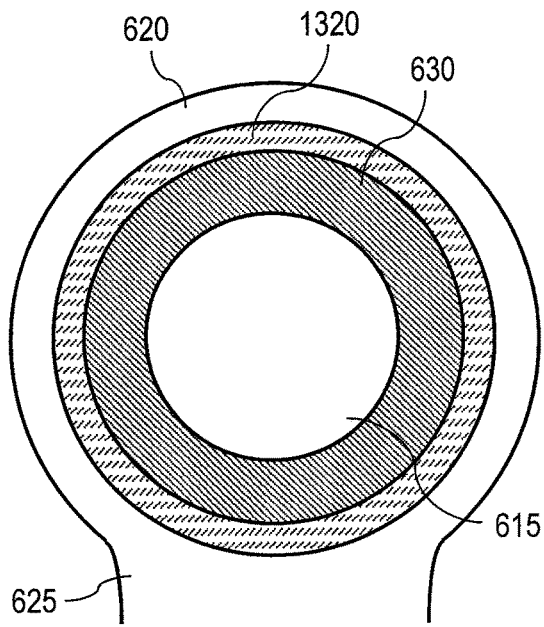

FIGS. 13A through 13C illustrate cross-sectional views of mounting/support components taken along a line 13-13 identified in FIG. 6 in accordance with embodiments of the present disclosure. Each of FIGS. 13A through 13C shows the cross-section of the mounting stem 615, mounting ring 630, annular portion 620, and portion of arm 625. As previously discussed, a bonding layer may be disposed between the mounting stem 615 and the mounting ring 630 and/or between the mounting ring 630 and the annular portion 620.

In FIG. 13A, a bonding layer 1305 is disposed between the mounting stem 615 and the mounting ring 630, and a bonding layer 1310 is disposed between the mounting ring 630 and the annular portion 620. In this regard, the bonding layer 1305 is disposed between the surface 705 of the mounting stem 615 and the inner surface 805 of the mounting ring 630, and the bonding layer 1310 is disposed between the outer surface 810 of the mounting ring 630 and the inner surface 1010 of the annular portion 620. The bonding layer 1305 and bonding layer 1310 may be referred to as an inner glue-line and an outer glue-line, respectively. In various embodiments, the bonding layer 1305 may be thinner than, thicker than, or the same thickness as the bonding layer 1310. In some cases, the thickness of the bonding layers 1305 and 1310 may each be about 50 μm to about 75 μm. The thickness of the bonding layers 1305 and 1310 that may be utilized may be based on the material used for the bonding layers 1305 and 1310.

In FIG. 13B, a bonding layer 1315 is disposed between the mounting stem 615 and the mounting ring 630. In this regard, the bonding layer 1315 is disposed between the surface 705 of the mounting stem 615 and the inner surface 805 of the mounting ring 630. At least a portion of the outer surface 810 of the mounting ring 630 is in contact (e.g., direct physical contact) with the inner surface 1010 of the annular portion 620 such that the mounting ring 630 is fixedly joined to the annular portion 620.

In FIG. 13C, a bonding layer 1320 is disposed between the mounting ring 630 and the annular portion 620. In this regard, the bonding layer 1320 is disposed between the outer surface 810 of the mounting ring 630 and the inner surface 1010 of the annular portion 620. At least a portion of the inner surface 805 of the mounting ring 630 is in contact with the surface 705 of the mounting stem 615 such that the mounting ring 630 is fixedly joined to the mounting stem 615.

In FIGS. 13A through 13C, the bonding layers 1305, 1310, 1315, and 1320 are substantially symmetric. A symmetric bonding layer has a uniform thickness. For example, the bonding layer 1305 is of a substantially uniform thickness between the mounting stem 615 and the mounting ring 630. Thinner and/or symmetric bonding layers are subjected to fewer uneven forces than thicker and/or asymmetric bonding layers.

In an embodiment, the bonding layers (e.g., 1305, 1310) may be of a material that has the same or similar coefficient of thermal expansion (CTE) as the mirror assemblies (e.g., 305, 315, 325, 605) and/or the mounting rings (e.g., 365, 370, 630). By way of non-limiting example, the material of the mirror assemblies, mounting rings, and/or bonding layers may include aluminum, beryllium, silicon, silicon-carbide, glass (e.g., borosilicate glass), plastic, ceramic alloys, or combination thereof. In some cases, the material may include various ceramic alloys that combine aluminum with any of these other materials listed.

By utilizing bonding layers of a material with the same or similar CTE as the material of the mirror assemblies and mounting rings, uneven forces/stresses (e.g., uneven shrinking or expanding due to temperature changes) exerted on the different components due to differing CTEs of the components may be reduced (e.g., if materials are similar) or avoided (e.g., if materials are the same) over a temperature range of operation of an optical system (e.g., 100). Uneven forces may cause tilt and/or decenters that adversely affect mirror position and orientation. The uneven forces may occur due to temperature changes during operation of an optical system and/or during curing of the bonding layers. In this regard, the use of the same or similar material for the bonding layer, mounting ring, mounting stem, and mirror may allow these components to expand or contract in a similar manner to maintain position and orientation/alignment of the mirror in spite of temperature fluctuations. As an example, the optical system may be operated in a temperature range between about −50° C. and about 90° C.

In some cases, a material of the bonding layers may be amenable to curing by exposure to ultraviolet (UV) light. In such cases, the mirror material and/or mounting ring material may be transparent material, such as glass (e.g., borosilicate glass, low expansion glass, and/or other types), and plastic, to provide good exposure of the bonding layers to the UV light to allow a quick and evenly-cured bond-line. The UV curing operation may be performed using pulses of light. In other cases, a non-UV curing adhesive may be utilized, such as in a case in which the mirror material and/or mounting ring material is not amenable to a UV curing adhesive. In such cases, a room temperature cure may be utilized.

In an aspect, a UV cure is of shorter duration than a room temperature cure. For example, whereas the room temperature cure may be complete in a day, the UV cure may be completed in seconds or minutes. In some cases, since the UV curing may raise temperature of the adhesive material during the curing process, the duration of the UV curing operation may be set such that the heat generated during the UV curing does not adversely affect the optical system. In this regard, the heat generated from an overly rapid UV curing (e.g., completed within seconds) may cause uneven forces/stresses that pull optical components out of position and/or alignment/orientation.

Figure 14:
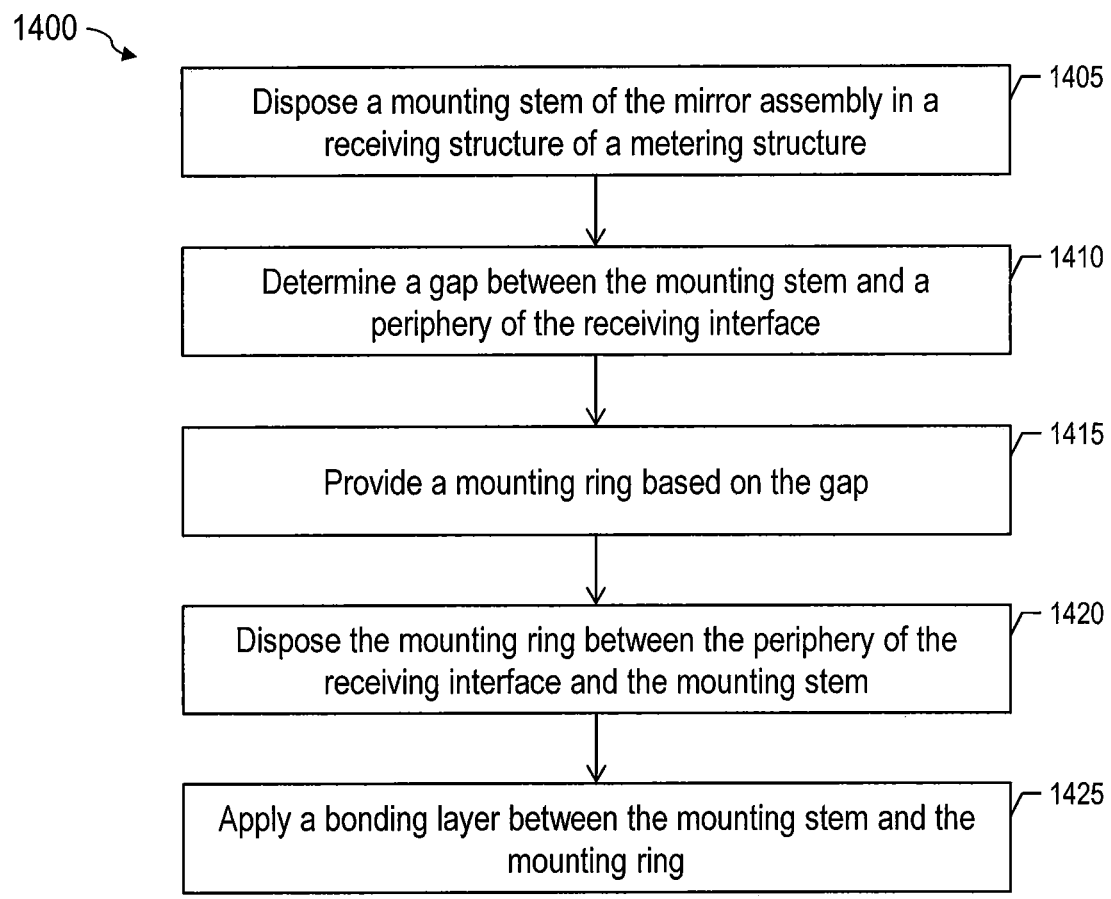
FIG. 14 illustrates a flow diagram of an example process for facilitating mounting of optical elements in optical systems in accordance with an embodiment of the present disclosure.

FIG. 14 illustrates a flow diagram of an example process 1400 for facilitating mounting of optical elements in optical systems in accordance with an embodiment. For explanatory purposes, the example process 1400 is primarily described herein with reference, for example, to the various components in the preceding figures (e.g., the optical system 100 of FIG. 1, mirror assembly 605 of FIG. 6); however, the example process 1400 is not limited to those components described in the preceding figures.

At block 1405, a mounting stem (e.g., 615) of a mirror assembly (e.g., 605) is disposed in a receiving interface (e.g., 1005) of a metering structure (e.g., 335). The mounting stem may be disposed within an inner surface of the receiving interface such that an outer surface (e.g., 705) of the mounting stem faces an inner surface (e.g., 1010) of an annular portion (e.g., 620) of the metering structure. The inner surface of the receiving interface may be (e.g., may coincide with) the inner surface of the annular portion. At block 1410, a gap (e.g., 1105) between the mounting stem and the inner surface of the receiving interface is determined. The gap may be determined by measuring a size and shape of the gap between the mounting stem and the inner surface of the receiving interface. Determining the shape of the gap may include determining an eccentricity exhibited by the gap, if any. In an embodiment, to facilitate measurement of the gap, the mounting stem may be held in place (e.g., by a chuck) at the desired position in the receiving interface to allow the gap to be measured.

At block 1415, a mounting ring (e.g., 630) is provided based on the gap. In an aspect, the mounting ring may be selected from available mounting rings of different sizes, shapes, and/or eccentricities. In an aspect, such as when a mounting ring of a certain size, shape, and/or eccentricity is not available, the mounting ring may be designed and fabricated based on the gap. In this regard, the eccentricity of the mounting ring, or lack thereof, is selected to align the mirror assembly (e.g., the mirror) with an optical path of the optical system. With the mounting ring, the mirror assembly (e.g., the mirror) may be aligned to reflect a beam of EM radiation along the desired optical path of the optical system.

At block 1420, the mounting ring is disposed within the gap between the inner surface of the receiving interface and the mounting stem. At block 1425, a bonding layer (e.g., 1310) is applied between the mounting stem and the mounting ring. In this regard, the mounting ring may generally be designed to nominally fill an entirety of the gap or at least a sufficient amount of adhesive to prevent undesired changes in the position and orientation/alignment of the mirrors during operation. Any remaining gap or gaps may be filled with an adhesive, a solder, or other binding material. For example, a gap between the outer surface of the mounting stem and the inner surface of the mounting ring may be determined and an amount of adhesive to fill the gap may be determined. In some cases, filling the gap may include filling an entirety, or close to the entirety, of the gap. In other cases, filling the gap may include filling a sufficient amount of the gap such that the applied bonding layer, upon being cured, is sufficient to hold the mirrors in place (e.g., over an operation temperature range). In an embodiment, alternatively or in addition to applying a bonding layer between the mounting stem and the mounting ring, a bonding layer (e.g., 1305) may be applied between the mounting ring and the inner surface of the receiving interface.

The bonding layers may be cured to toughen/harden the bonding layers and set the mirror assemblies in place. In an aspect, the curing operation of the bonding layers may occur at overlapping times or non-overlapping times. For example, in some cases, a curing operation is performed from start to finish from the bonding layer 1310 first, and then a curing operation is performed for the bonding layer 1305, or vice versa. In other cases, the curing operations of the bonding layers 1305 and 1310 may at least partially overlap in time. In an aspect, curing of bonding layers associated with different mirror assemblies may occur at overlapping or non-overlapping times.

In an embodiment, the process 1400 may be performed on additional mirror assemblies, such as the mirror assemblies 305, 315, and/or 325. In some cases, one or more of the mirror assemblies 305, 315, and/or 325 may be fixedly joined/coupled to the metering structure 335 through means in addition or alternative to mounting rings and bonding layers. In some cases, the utilization of the mounting ring in conjunction with the bonding layers may be applied to a subset of mirrors in an optical system. For example, with respect to FIG. 1, in some cases, the secondary mirror 120 and tertiary mirror 125 may each be coupled to a respective receiving interface of a metering structure via a mounting stem, mounting ring, and bonding layers, whereas the primary mirror 115 might not utilize a mounting ring and/or bonding layers to couple the mirror 115 to its receiving interface of the metering structure.

In an embodiment, prior to performing the example process 1400, the material, structure, position, orientation/alignment of mirrors (e.g., 115, 120, 125) and associated mounting/support components (e.g., 310, 320, 330, 335) in a housing (e.g., 105) of an optical system (e.g., 100) may be determined for effectuating application specifications (e.g., image quality, image size, operating temperature range, magnification requirements, dimensional requirements), and the mirrors and associated mounting/support components fabricated based on these determined characteristics. For instance, the position and orientation/alignment of the metering structure and components thereof (e.g., annular portion 620, arm 625) are designed and fabricated to accommodate the determined positions and orientations/alignments for the mirrors and mounting stems. In this regard, mounting rings to facilitate fixedly joining/coupling of mirrors to the metering structure is provided (e.g., manufactured, selected from available mounting rings) after the mirrors' position and orientation/alignment have been determined. In some cases, the position and orientation/alignment of various relay optics, processors, beamsplitters (e.g., 140), and/or sensors (e.g., 145) may also be determined.

In one or more embodiments, utilization of the mounting ring and bonding layers to facilitate mounting of a mirror assembly in an optical system may loosen manufacturing tolerances for the various mirror parts and mounting/support features of the optical system, including loosened tolerances for the mirrors, mounting stems, and/or metering structure (e.g., arms, annular portions). The loosened tolerances may allow for a more streamlined, higher quantity and lower cost manufacturing of optical systems and/or components thereof.

As an example, a size of a gap between a mounting stem (e.g., 615) and an inner surface of a receiving interface may be about 2 mm to about 6 mm. For instance, the size of the gap may be measured as a radial distance between an inner surface (e.g., 1010) of an annular portion (e.g., 620) and a surface (e.g., 705) of a mounting stem (e.g., 615). The mounting ring may be disposed to at least partially fill (e.g., nominally fill) this gap, with any remaining gap or gaps being filled with adhesive.

Consider that the size of the gap is 4 mm. The mounting ring may have a nominal average cross-section thickness of 4 mm. The mounting ring may exhibit eccentricity, such that the mounting ring may have a minimum cross-section thickness of 1 mm and a maximum cross-sectional thickness of 7 mm. In this case, the allowable manufacturing error that can be accommodated by using the mounting ring may be about 3 mm. The ±3 mm tolerance may be distributed among manufacturing of the different components (e.g., mirror, mirror stem, metering structure or components thereof) to loosen manufacturing precision of these components, e.g. 1.5 mm for the mounting stem feature and 1.5 mm for the annular portion feature. Such tolerance is looser than cases in which no mounting ring is formed. In addition, building eccentricity into the mounting ring, if needed, accommodates asymmetries in the gap (if any) and facilitates applying glue-lines with cross-sections of a constant, even thickness (e.g., or nearly constant, near even thickness) all the way around. In this regard, the tolerance accommodation is addressed using an eccentric mounting ring, rather than addressed by applying a thicker and/or asymmetric glue-line without using a mounting ring.

The manufacturing tolerances according to an embodiment of the present disclosure is looser than a snap-together case in which the mounting stems of the mirrors are fabricated to tightly fit with annular portion of the metering structure, e.g. without any mounting ring or bonding layer. The tight fit of the mounting stems with the annular portions involves building the precision into each part, so that the parts can be directly mounted without additional optical reference positioning. The tight fit is generally associated with high-precision manufacture of components, associated attachment features (e.g., mechanical attachment features), and associated reference/attachment points, all of which need to be fabricated with high accuracy. As an example, in some cases, each component and associated attachment features may need to be accurate to within single digit microns.

The mounting ring and the bonding layers may loosen tolerances relative to a case in which a bonding layer is applied without a mounting ring. In this case, a bonding layer may be disposed in a gap between a surface of the mounting stem and an inner surface of an annular portion of a metering structure (without an intervening mounting ring). The tolerances of at least the mounting stem and the annular portion may be loosened relative to a snap-together case, as a gap between the mounting stem and the annular portion can be filled up with an adhesive, solder, or some other bonding method that can tolerate some variation.

For instance, a gap between the mounting stem and annular portion may be 400 µm±100 µm (e.g., the nominal gap is 400 µm whereas the ±100 µm represents the tolerance of the gap). The bonding layer may be utilized to accommodate a non-uniform thickness of the gap, since a variable glue-line thickness (e.g., a thinnest glue-line cross-section of 300 µm and a thickest glue-line cross-section of 500 µm) may be applied as needed to fill the gap. In this regard, the ±100 µm tolerance may be distributed among manufacturing of the different components (e.g., mirror, mirror stem, metering structure or components thereof) to loosen manufacturing precision of these components. The ±100 µm tolerance is looser than the snap-fit case in which each component may need to be manufactured to accuracies within single digit microns. It will be appreciated that the tolerances may be multiple orders of magnitude (e.g., 1, 2, or 3 orders of magnitude) looser than tolerances for the snap-fit case.

However, without a mounting ring, positional accuracy in placing the mounting stem within a receiving interface of a metering structure may affect the size and symmetry of the gap for the bond-line interface. Thicker and/or asymmetric glue-lines may allow temperature fluctuations to pull mirrors out of place during operation of the optical system and/or during curing operations (e.g., UV curing). In some cases, a non-uniformity (e.g., asymmetry) in the glue-line cross-section size (e.g., ranging from 300 µm to 500 µm) may be sufficiently large that the glue may pull the mirror out of position and/or alignment/orientation, e.g. when the bonding layers shrinks due to a change in temperature. In this regard, different portions of the bonding layer with different thicknesses may be unevenly affected by changes in temperature. For example, a mirror that utilizes the bonding layer to maintain its position and orientation/alignment may be pulled out of position and/or orientation/alignment when the bonding layer shrinks (e.g., shrinks non-uniformly across its cross-section) during cure or during temperature fluctuation over a normal/expected operating temperatures associated with the optical system.

Although the foregoing embodiments are described with reference to components with generally circularly shaped (e.g., circular, oval) cross-sections, such as a cylindrical mounting stem, mounting ring, annular portion, other shapes may be utilized for such components, such as parallelepiped-shaped components and/or conic-shaped components, and/or components of other shapes. In such a case, the various components of the mirror assemblies and associated mounting/support components are manufactured with appropriate sizes and shapes to aid in holding the mirrors in place.

It is noted that dimensional aspects provided above are examples and that other values for the dimensions can be utilized in accordance with one or more implementations.

Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

The description of the subject technology is provided to enable any person skilled in the art to practice the various aspects described herein. The foregoing description is not intended to limit the present disclosure to the precise forms or particular fields of use disclosed. Embodiments described above illustrate but do not limit the subject technology. It is contemplated that various alternate embodiments and/or modifications to the subject technology, whether explicitly described or implied herein, are possible in light of the disclosure. Accordingly, the scope of the invention is defined only by the following claims.

What is claimed is:

1. A system, comprising:
   a mirror assembly comprising a mounting stem and a mirror, wherein the mounting stem extends from the mirror;
   a mounting ring;
   a metering structure comprising a receiving interface having an inner surface defining an aperture, wherein the metering structure is configured to receive the mounting stem within the aperture and receive the mounting ring within a gap between the mounting stem and the inner surface; and
   a bonding layer disposed between the mounting stem and the mounting ring.

2. The system of claim 1, wherein the mounting ring is an eccentric ring comprising inner and outer surfaces defining corresponding inner and outer circles offset from each other.

3. The system of claim 2, wherein the offset of the inner and outer circles of the eccentric ring is selected to align the mirror to reflect a beam of electromagnetic radiation along a desired optical path of the system.

4. The system of claim 1, wherein the bonding layer is a first bonding layer, the system further comprising a second bonding layer disposed between the inner surface of the receiving interface and the mounting ring.

5. The system of claim 4, wherein the first bonding layer is in contact with the mounting stem and an inner surface of the mounting ring, and wherein the second bonding layer is in contact with the inner surface of the receiving interface and an outer surface of the mounting ring.

6. The system of claim 1, wherein the bonding layer exhibits a substantially uniform thickness.

7. The system of claim 1, wherein the metering structure comprises an annular portion that defines the receiving interface.

8. The system of claim 1, wherein the mirror is attached to the mounting stem.

9. The system of claim 1, wherein the mirror is integral with the mounting stem.

10. The system of claim 1, further comprising:
    an input collecting aperture configured to receive a beam of electromagnetic radiation;
    an output collecting aperture;
    a sensor configured to receive the beam from the output collecting aperture; and
    wherein the mirror assembly is configured to pass the beam between the input collecting aperture and the output collecting aperture.

11. The system of claim 10, wherein the sensor is a first sensor associated with a first wavelength range, the system further comprising:
    a second sensor associated with a second wavelength range; and a beamsplitter configured to pass the beam from the output collecting aperture to the first and second sensors.

12. The system of claim 10, wherein the mirror assembly is a first mirror assembly, the system further comprising:
    a second mirror assembly configured to pass the beam from the input collecting aperture to the first mirror assembly; and
    a third mirror assembly configured to pass the beam from the first mirror assembly to the output collecting aperture.

13. The system of claim 1, wherein the system is a telescope.

14. A method, comprising: disposing a mounting stem of a mirror assembly within an aperture of a metering structure, wherein the metering structure comprises a receiving interface having an inner surface defining the aperture, wherein the mirror assembly comprises the mounting stem and a mirror, and wherein the mounting stem extends from the mirror;
    determining a gap between the mounting stem and the inner surface;
    providing a mounting ring based on the gap;
    disposing the mounting ring between the mounting stem and the inner surface; and
    applying a bonding layer between the mounting stem and the mounting ring.

15. The method of claim 14, further comprising curing the bonding layer using ultraviolet light.

16. The method of claim 14, wherein the bonding layer is a first bonding layer, the method further comprising applying a second bonding layer between the inner surface and the mounting ring.

17. The method of claim 16, wherein the first bonding layer is applied between a surface of the mounting stem and a first surface of the mounting ring, and wherein the second bonding layer is applied between the inner surface of the receiving interface and a second surface of the mounting ring.

18. The method of claim 16, wherein a thickness of the first bonding layer is different from a thickness of the second bonding layer.

19. The method of claim 16, wherein each of the first bonding layer and the second bonding layer exhibits a substantially uniform thickness.

20. The method of claim 16, wherein the mounting ring exhibits eccentricity selected to align the mirror assembly to reflect a beam of electromagnetic radiation along a desired optical path of an optical system.

* * * * *